(12) United States Patent
SanGiovanni et al.

(10) Patent No.: US 10,019,963 B2
(45) Date of Patent: Jul. 10, 2018

(54) SYSTEMS AND METHODS FOR ADAPTIVE THIRD PARTY CONTENT

(71) Applicant: Zumobi, Inc., Seattle, WA (US)

(72) Inventors: John SanGiovanni, Seattle, WA (US); Benjamin B. Bederson, Chevy Chase, MD (US); Ben Painter, Seattle, WA (US)

(73) Assignee: Zumobi, Inc., Seattle, WA (US)

(*) Notice: Subject to any disclaimer, the term of this patent is extended or adjusted under 35 U.S.C. 154(b) by 991 days.

(21) Appl. No.: 13/829,668

(22) Filed: Mar. 14, 2013

(65) Prior Publication Data

US 2014/0267198 A1   Sep. 18, 2014

(51) Int. Cl.
H04N 5/445 (2011.01)
G09G 5/00 (2006.01)
G06F 17/21 (2006.01)
H04N 21/431 (2011.01)
G09G 5/14 (2006.01)

(52) U.S. Cl.
CPC .............. G09G 5/00 (2013.01); G06F 17/211 (2013.01); G09G 5/14 (2013.01); G09G 2340/0407 (2013.01); G09G 2340/0464 (2013.01); G09G 2340/0492 (2013.01); G09G 2340/14 (2013.01); H04N 21/4316 (2013.01)

(58) Field of Classification Search
CPC .................................................. H04N 21/4316

USPC ..................................................... 725/40, 43
See application file for complete search history.

(56) References Cited

U.S. PATENT DOCUMENTS

| 8,640,165 | B2* | 1/2014 | Ellis .................. H04N 5/44543 725/38 |
| 2004/0070627 | A1* | 4/2004 | Shahine et al. ................ 345/794 |
| 2011/0119710 | A1* | 5/2011 | Jang et al. ....................... 725/41 |
| 2012/0242700 | A1* | 9/2012 | Osuga et al. ................. 345/638 |
| 2013/0283154 | A1* | 10/2013 | Sasakura ........................ 715/253 |
| 2014/0052546 | A1* | 2/2014 | Phan et al. ................. 705/14.72 |
| 2014/0132629 | A1* | 5/2014 | Pandey et al. ................ 345/633 |
| 2014/0139736 | A1* | 5/2014 | McCoy et al. ................ 348/445 |

* cited by examiner

Primary Examiner — Pankaj Kumar
Assistant Examiner — Sahar Baig
(74) Attorney, Agent, or Firm — Norton Rose Fulbright US LLP

(57) ABSTRACT

Systems and methods which allow for third party displayed content, which is displayed with primary content, to adapt in response to a change in permitted display space are provided for herein. In some embodiments, third party content may include a plurality of elements where the elements are provided with a different priority ranking. In such examples, in the event that an available display area is reduced, elements with lower priority levels may be reduced at a faster rate with respect to elements of higher levels. Conversely, in the event that an available display area is enlarged, elements with higher priority levels may be enlarged at a faster rate with respect to elements of lower priority levels.

24 Claims, 16 Drawing Sheets

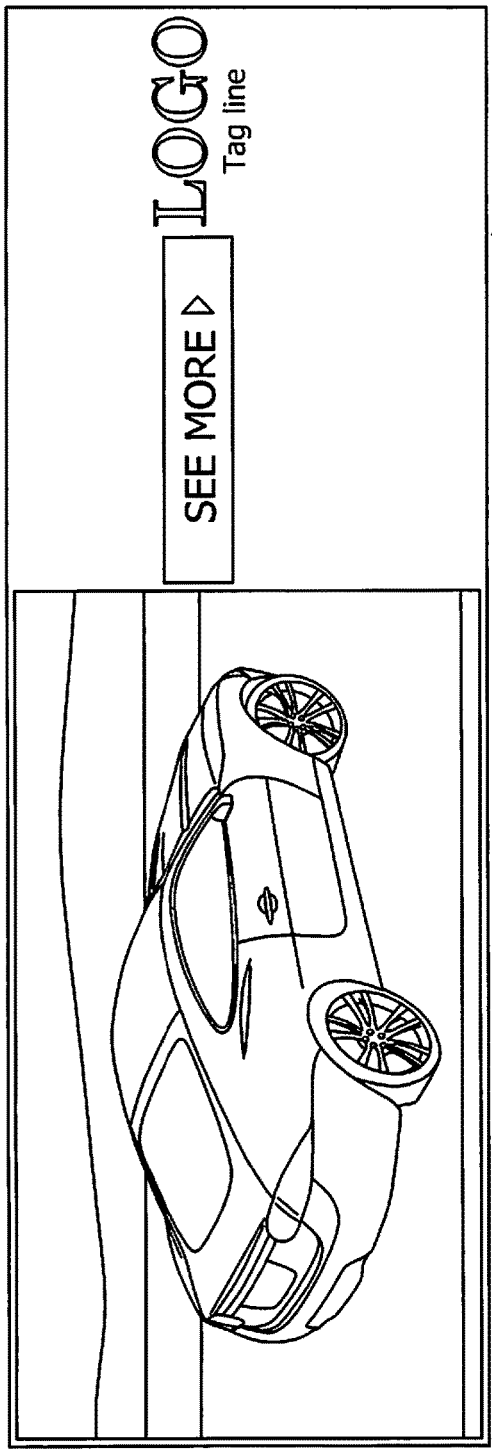
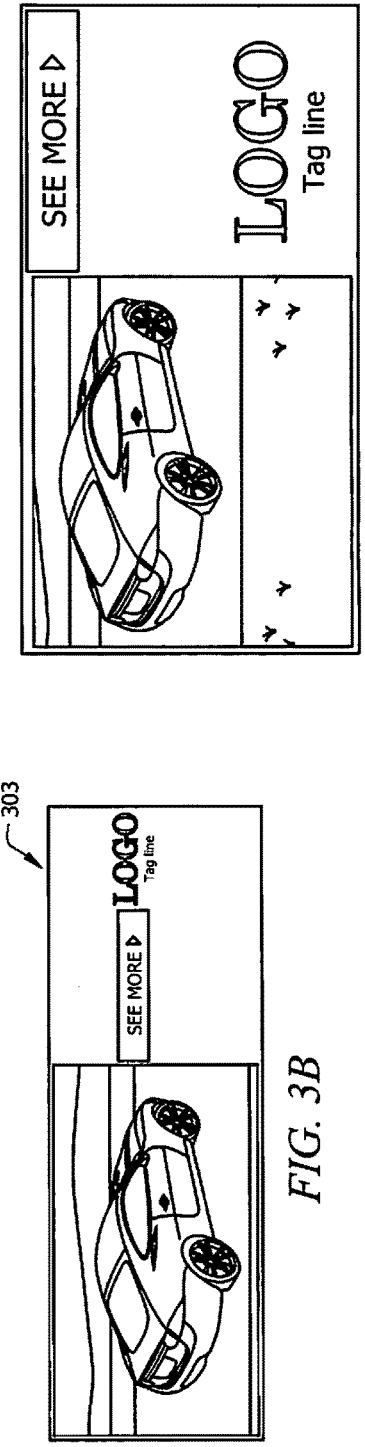
FIG. 3A
FIG. 3B
FIG. 3C

SYSTEMS AND METHODS FOR ADAPTIVE THIRD PARTY CONTENT

TECHNICAL FIELD

The present application relates to displaying content on a computing device, and more specifically to providing for adaptive sizing of displayed third party content.

BACKGROUND

Web page and application developers are constantly attempting to derive new methods for presenting content for display on a computing device. It is generally appreciated in the industry that effective presentation of information is valuable. In fact, the manner of presentation of data may provide a substantial portion of the value of a program, website or other data being presented.

One challenge to developers that has become more prevalent is that available display area for content may vary greatly between devices. This raises issues regarding how content may be displayed, what the area it can utilize on a screen, etc. For example, users may access the same website from multiple types of devices. In one instance, one user may access data on a website from a smartphone or tablet device, while another may access it from a computing device having a large screen and/or multiple screens. Further, among individual devices the display area may change with a change in orientation of the device.

Developers which are primarily concerned with providing third party content to an application, web page, and the like, such as for advertisements, have further issues when handling display area problems because scaling techniques are generally designed to adequately display payload data and often inhibit or even exclude the display of the third party content. For example, if the payload/primary data to be displayed in a webpage is reduced in size, the party administering the page may allow for a disproportionately smaller area for third party content in order to save area for the primary content. Accordingly, the particular scaling rules which are set for the primary content are not necessarily acceptable for use with third party content because the reduction in size may cause the third party content to be displayed in an unacceptable manner.

Because of this, advertisers currently create ad campaigns with multiple separate ads which can populate the area of the screen provided for third party content with one of the ads of the ad campaign based on the amount of space available. For example, a discrete ad may be written for display on a smartphone device, tablet device, and a computer display at various stages of minimization/maximization. However, in light of the large variances in possible display areas, it is difficult to provide the number of ads needed to anticipate the possible display areas. Further, issues may also arise when making the determination of which ad to provide and when to change between ads, e.g. it may slow the presentation of the content, be more prone to error, etc.

BRIEF SUMMARY

The present application provides systems and methods which allow for third party displayed content, which is displayed with primary content, to adapt in response to a change in permitted display space. In some embodiments, third party content may include a plurality of elements where the elements are provided with a different priority ranking. In such examples, in the event that an available display area is reduced, elements with lower priority levels may be reduced at a faster rate with respect to elements of higher levels. Conversely, in the event that an available display area is enlarged, elements with higher priority levels may be enlarged at a faster rate with respect to elements of lower priority levels.

In further embodiments, elements having a lower priority may not be displayed in certain circumstances. For example, in the event that there is a relatively small display space, one or more elements may not be displayed. Moreover, if there is a relatively large available display space for third party content, additional content may be displayed which would not have been displayed in circumstances where space is more limited.

Embodiments may also alter the positioning of one or more elements based on the available area to display third party content. For example, in an event where two elements are disposed side-by-side and the available area narrows in width, embodiments may place the elements one above the other.

In some embodiments a plurality of content schemes from a third party, e.g. multiple advertisements in an advertisement campaign, may be provided and the third party content may scale in an infinitely dynamic manner upon changing available display area for the content scheme. This dynamic scaling may include scaling within a single content scheme in a dynamic manner. Further, dynamic scaling may include switching to another content scheme upon crossing a predetermined threshold display area. Once the switch to another content scheme has been made, embodiments may also configure the other scheme to dynamically scale while available display area for third party content changes.

In some embodiments one or more elements provided with third party content may include one or more zones within an element which have different display rules with respect to portions of the element outside of the zones (also referred to herein as "safe zones"). For example, in the event that the element is a picture of an object in front of a landscape background, embodiments may define all or a portion of the object as being within a safe zone such that if the available display area for the third party content reduces, the display of the landscape background is eliminated instead of, or at a faster rate than, the display of the object.

In some embodiments a page being displayed may have multiple areas for third party content. Embodiments may utilize these multiple areas dynamically to provide for the display of one or more elements in a cooperative manner across the multiple areas. For example, if a displayed page has primary content and advertisements on each side of the primary content, embodiments may utilize the space of the advertisements to display content in a cooperative manner.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which:

FIGS. 3A-J illustrate an advertisement utilizing multiple elements in various states of scaling in accordance with an embodiment of the present application;

DETAILED DESCRIPTION

It is noted that much of the following discussion is in the context of advertising being sent to a destination to be displayed along with primary content. However, concepts outlined herein should not be limited to advertisements. The present concepts may be applicable, for example, in any circumstance where content from someone other than the party providing the primary content is displayed along with primary content in a display area of a size which is governed at least in part by design parameters dictated by the party providing the primary content.

Figure 1:
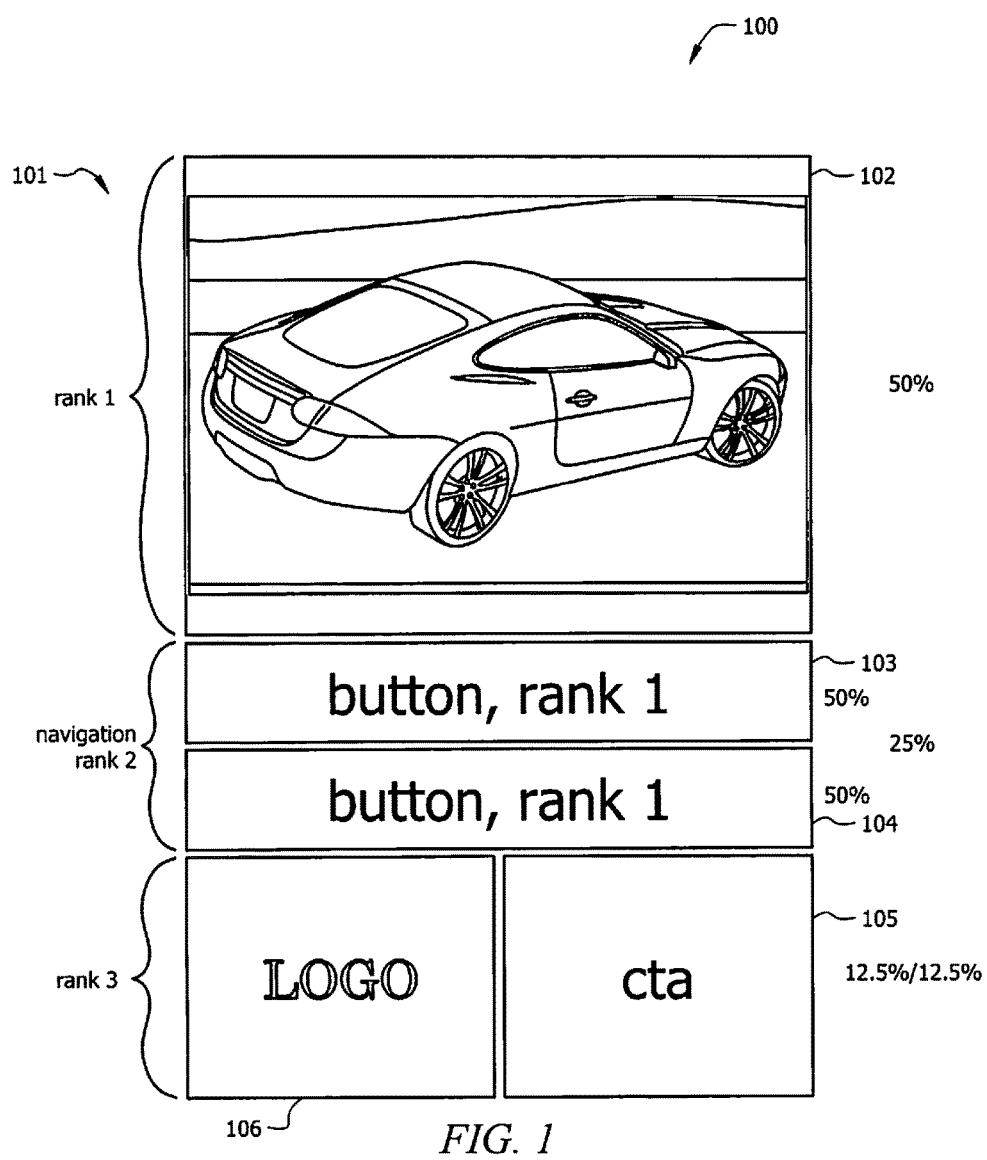
FIG. 1 illustrates a third party advertisement in accordance with an embodiment of the present application.

FIG. 1 illustrates a third party advertisement 100 in accordance with an embodiment of the present application. Advertisement 100 may have a plurality of elements of different rank (indicated by 101). Specifically, advertisement 100 includes an image element 102, button elements 103, 104, call to action (CTA) element 105 and logo element 106. Image element 102 may be a primary image of an advertisement, such as an automobile in an automobile advertisement, a model in a clothing advertisement, and the like. In the illustrated embodiment image element 102 is given a rank of 1 and is allowed 50% of the displayable space taken by advertisement 100. A rank of 1 may provide various properties based on preferences of the designer of third party advertisement 100. For example, elements with a higher rank may be configured such that they remain in a displayable area and are displayed in the event that the displayable area does not have sufficient space to display every element (e.g. elements of lower ranks). The 50% value in the illustrated embodiment connotes that element 102 may be provided with 50% of the displayable area of advertisement 100.

Button elements 103, 104 may be buttons that allow for any type of functionality. For example, button elements 103, 104 may provide for functionality to cycle images within image element 102. Additionally, button elements may be buttons in which a user may make a selection to, e.g. change the appearance of other portions of advertisement 100, accept user inputs for polling data, and the like. Button elements are provided with a rank of 2 and together are allowed to utilize 25% of the displayable space. It is appreciated that the rank of button elements 103, 104 may provide button elements 103, 104 with different abilities/functionality with respect to elements of other ranks. For example, differing rules regarding the display and/or types of actions provided for by button elements 103, 104 may be established to determine when button elements 103, 104 are displayed, what functionality can button elements 103, 104 may accomplish, and the like.

CTA element 105 and logo element 106 are provided with a rank of 3 and are each given 12.5% of the displayable area of advertisement 100 respectively. A CTA may comprise a link which provides a user with a quick link to a site associated with the advertiser. Such an element may be configured with the ability to change its location upon the changing of the total displayable area for advertisement 100. These configurations may be implemented when programming the individual element, or may also be configured with such functionality based on the provided rank.

It is noted that in other embodiments elements 102-106 may be assigned different priorities. For example, it may be that logo element 106 is the more recognizable portion of advertisement 100 and it may be preferable to allow it to have priority over other elements in the event that the displayable area for advertisement 100 changes. This may be the case even when image element 102 would generally need a larger display area to adequately display content. It is further noted that the illustrated displayable area values may alter upon the displayable area crossing various thresholds. For example, in one embodiment, the total displayable area may become very large, however, it may not be preferable to continue increasing the size of an image element. Accordingly, image element 102 may occupy lower than 50% of the space in such a circumstance. The opposite may also be true. For example, embodiments may specify a minimum size for an element such that when the displayable area is below a pre-determined threshold, one or more elements may cease reducing in size (thereby causing such elements to occupy a larger percentage of space).

Figure 2:
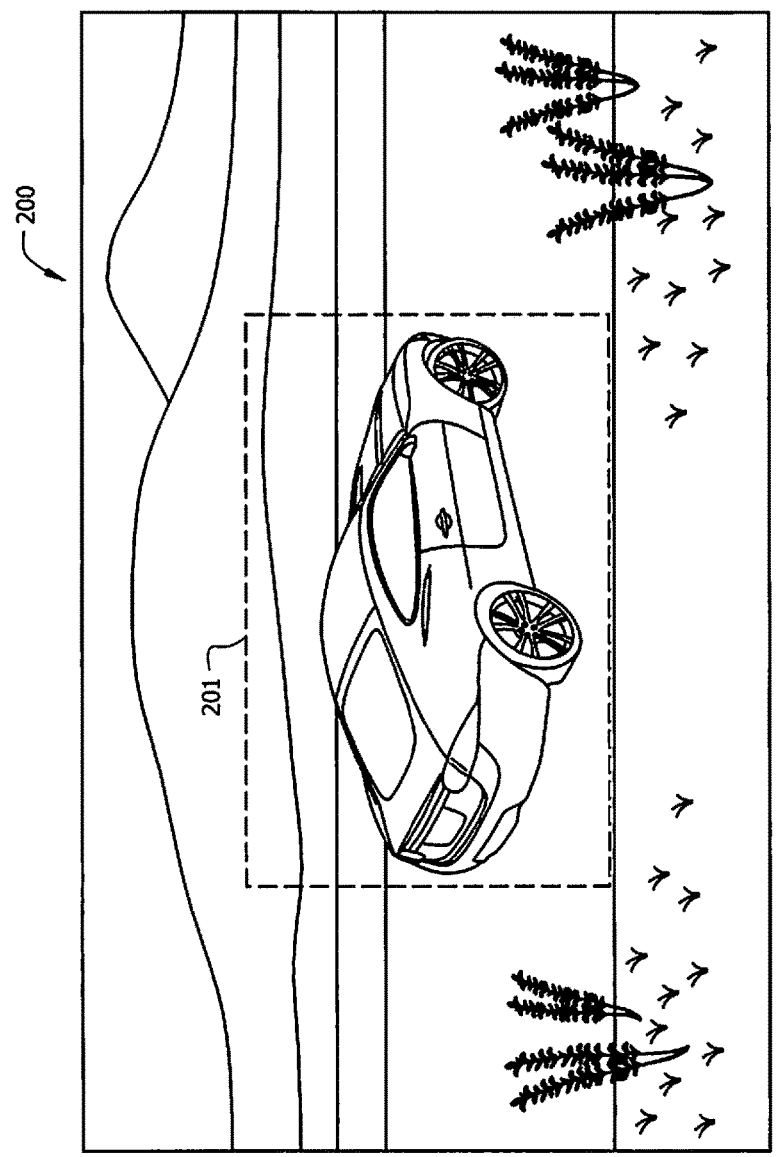
FIG. 2 illustrates an image element in accordance with an embodiment of the present application.
Figure 3D:
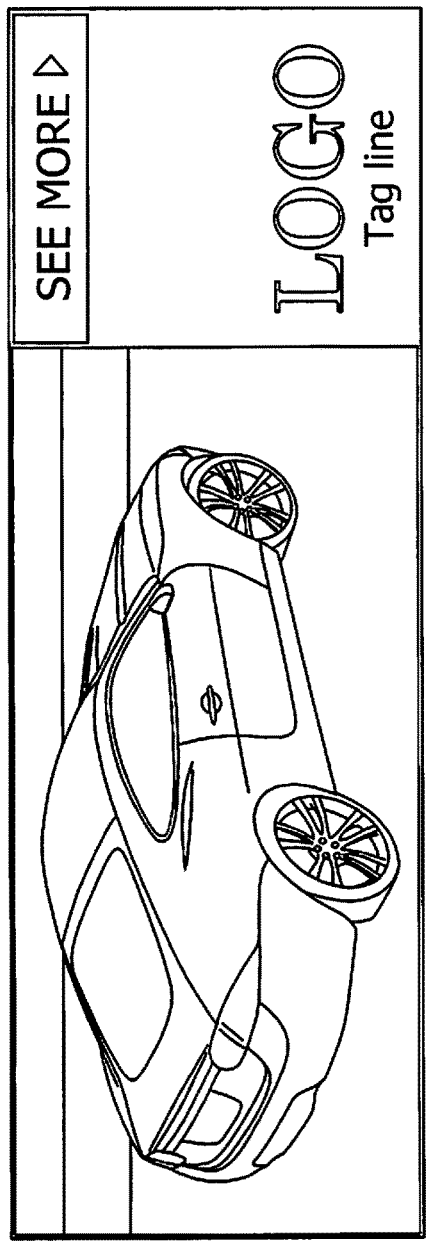
Figure 3E:
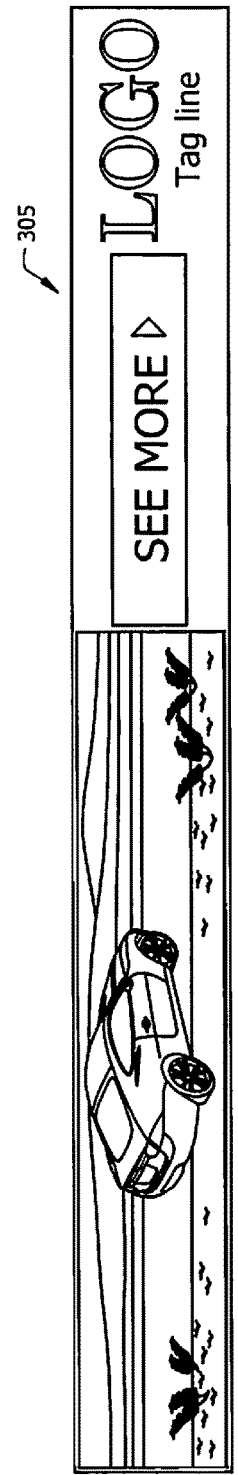
Figure 3F:
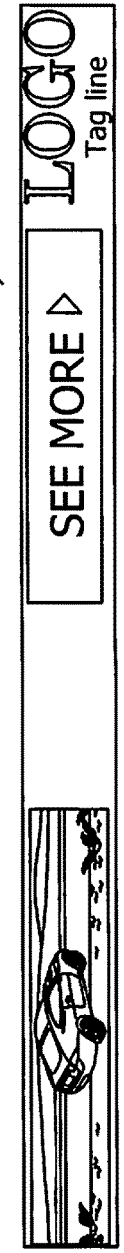
Figure 3G:
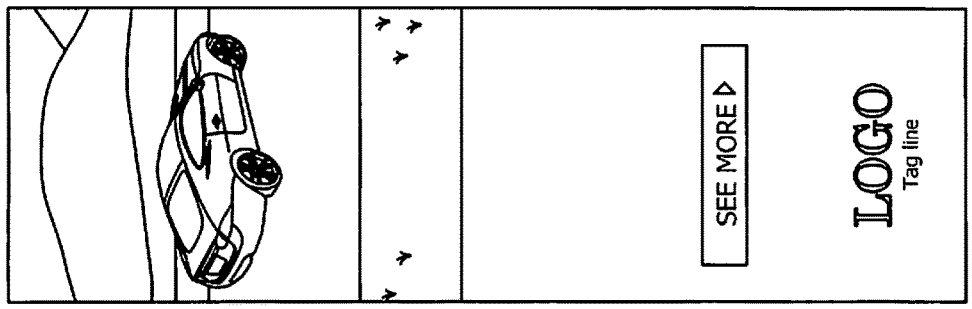
Figure 3G:
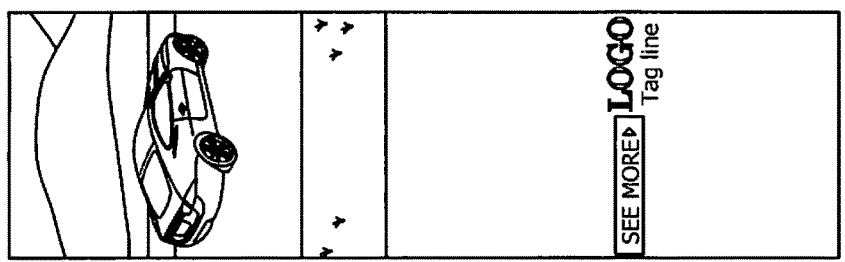
Figure 3G:
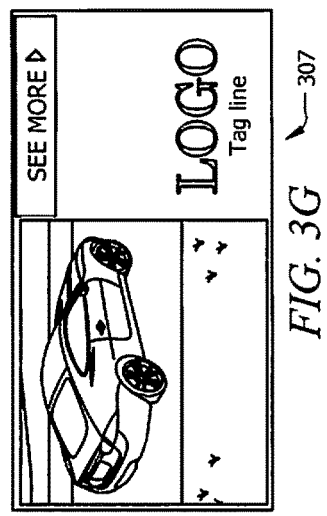
Figure 3H:
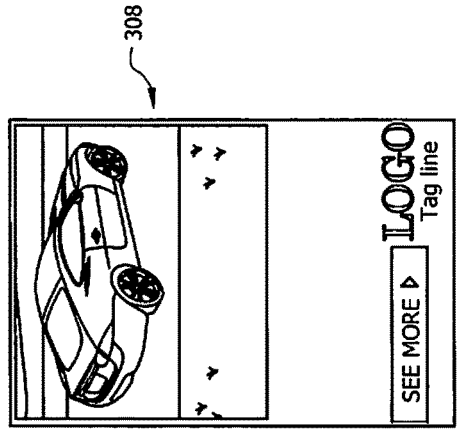

FIG. 2 illustrates an image element 200 in accordance with an embodiment of the present application. Image element 200 may include a full image and an image safe zone (denoted by 201). Safe zone 201 may be configured to allow the designated portion of the image to be as large as possible. Image element 200 may be configured such that if the available display area for the image is wider than safe zone 201, safe zone 201 may be height constrained, e.g. enabling image element 200 to display portions of an image which are outside of the width of safe zone 201 without causing undue distortion of the image portion within safe zone 201. Additionally, if the available display area is taller than the height of safe zone 201, than the image portion within safe zone 201 may be width constrained so the safe portion of image will be constrained to the width of the core and extra space above and below the image may be displayed. Some embodiments may be configured such that the entirety of a safe zone will always be displayed in the event that the element having the safe zone is displayed.

In some embodiments, one or more elements may include/display an overlapping portion within the element or an overlapping element. For example a displayable text and/or logo portion or element may overlap an image element. In the event that the displayable area is altered for such an element, embodiments may be configured to alter the placement of the overlapping items to be disposed in a manner which is not interfering with other portions of the element. For example, in the event that image element 200 included an overlapping text item outside of safe zone 201, it may be preferable to prevent the text item from covering the subject of the safe zone. Embodiments may configure an element to provide a pre-specified space for an overlapping portion (either inside or outside of a safe zone), and provide various criteria for the scaling of the content of the overlapping portion, etc. Some embodiments may also treat the overlapping area as a safe zone.

FIGS. 3A-J illustrate an advertisement 300 utilizing multiple elements in various states of scaling in accordance with an embodiment of the present application. Advertisement 300 includes three different elements, an image element (e.g. showing an image of a car and landscape), a call to action, and a logo element. Advertisements 301-303 are block-type advertisements which would be given a section of space with displayed content in a defined framed area. Advertisements 304-306 are horizontal banner advertisements which may be displayed across a substantially horizontal length of a display area. Advertisements 307-310 are vertical banner advertisements which may be displayed across a substantially vertical length of a display area.

As illustrated in the embodiment of FIGS. 3A-J, the image element may include a safe zone which allows more or less area of the subject image of the image element to be displayed based on the amount of available space. For example, in horizontal banner advertisements 304-306 when additional horizontal space is available, more of the width of the subject image is shown outside of the safe zone. In vertical banner advertisements 307-310 more of the length of the subject image is shown outside of the safe zone when additional vertical display area is available. In this embodiment, the logo element and call to action element are fully illustrated (e.g. they do not include safe zones) in each case, however these elements are scaled according to the available display area for the elements.

Figure 4A:
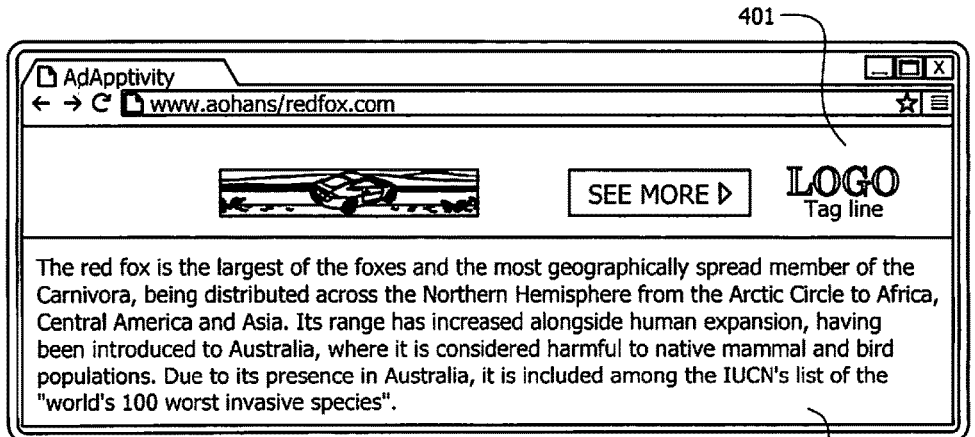
FIGS. 4A-4H illustrate various example displays of an advertisement in accordance with an embodiment of the present application.
Figure 4B:
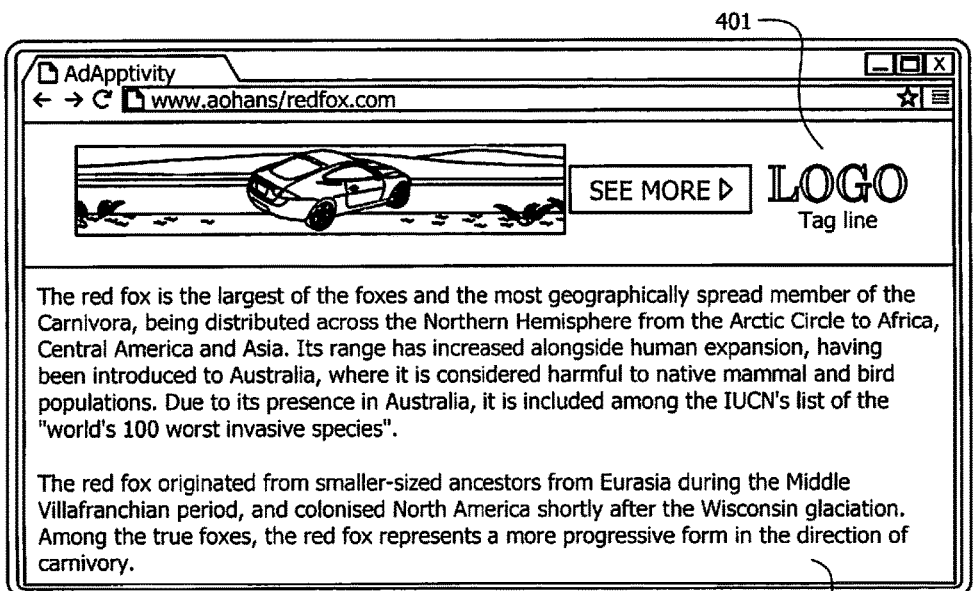

FIGS. 4A-4H illustrate various example displays 400 of advertisement 300 in accordance with an embodiment of the present application. Each display includes a third part content portion (e.g. advertisement portion 401) and a primary content portion 402. In FIG. 4A, the displayable area is a horizontally elongated space and advertisement portion 401 is provided with a banner area above content portion 402. In FIG. 4B, the displayable area has been increased in height which has allowed for additional size scaling of advertisement portion 401. It is noted that the available widths between FIGS. 4A and 4B already allow for width portions outside of the safe zone of the image element to be displayed. As such, in this transition, the image is scaled in size without necessarily allowing for more of the image element to be displayed.

Figure 4C:
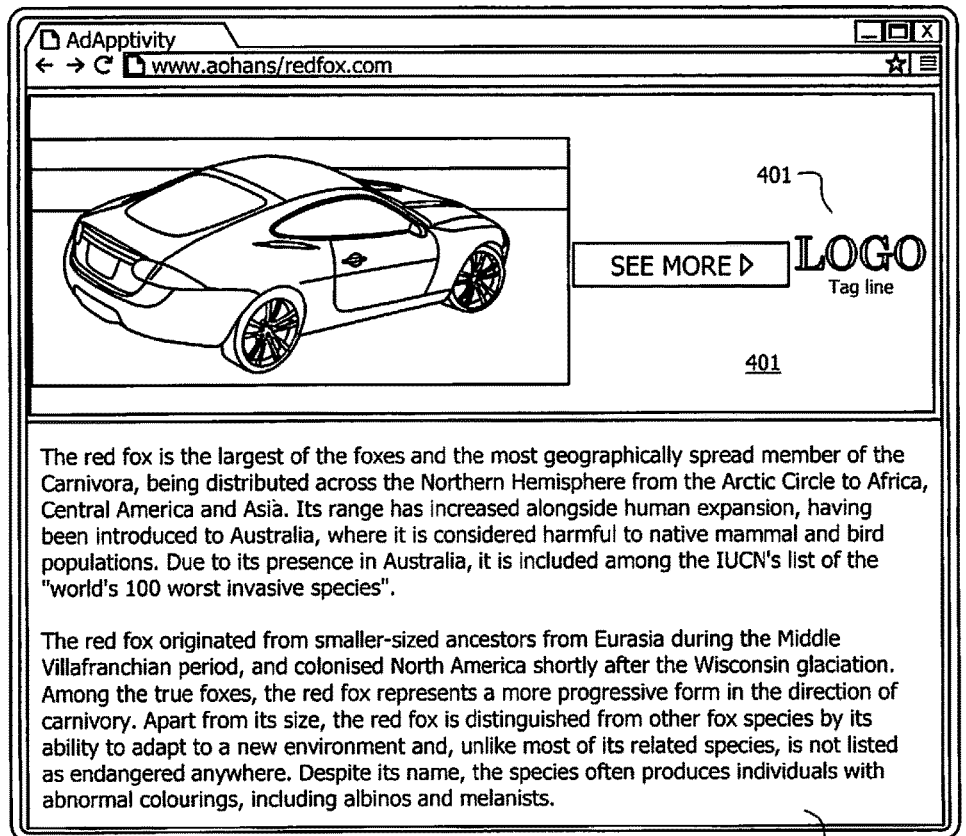
Figure 4D:
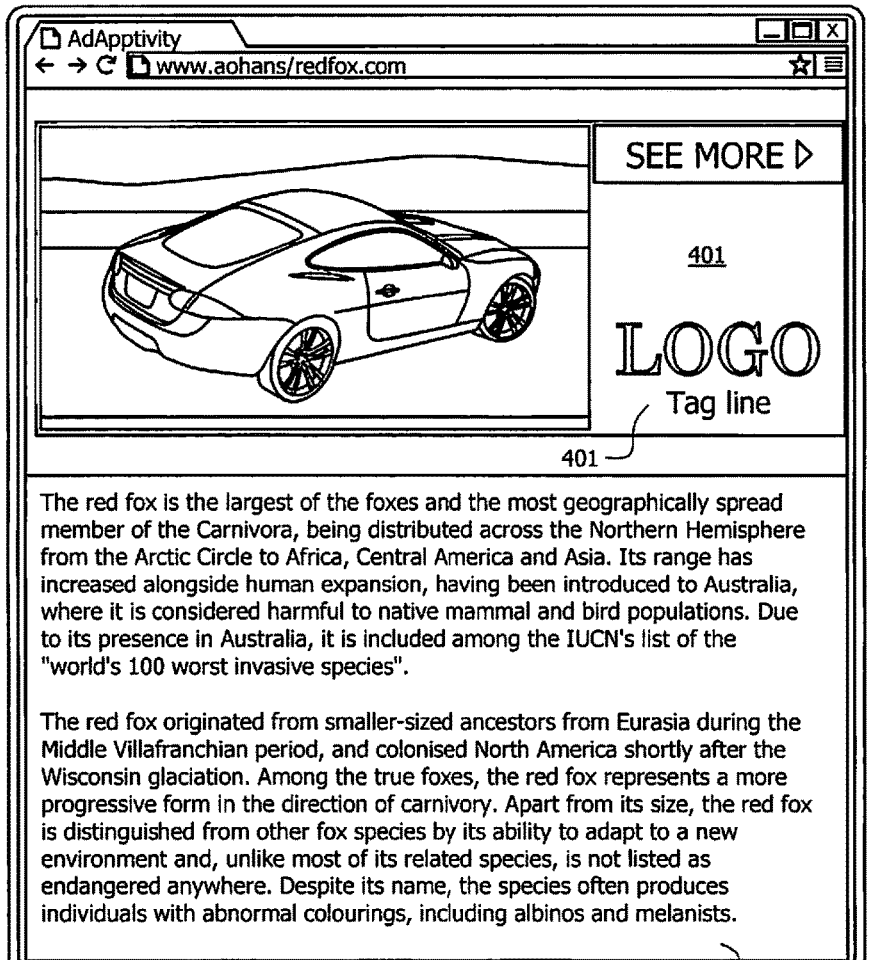

FIG. 4C illustrates another example where the displayable area has been narrowed in width, but been provided with additional length with respect to the displayable area of FIG. 4B. In this example, call to action element and logo elements are scaled and the image element reduces the display width portions of the image which are outside of the safe zone. This transition continues at FIG. 4D. In this example, because additional vertical area is available, the image element allows for vertical portions outside of the safe zone to be displayed. Additionally, because there is additional height, but reduced width, the call to action element and logo element are now disposed in an alternate content scheme, e.g. a vertical column layout. This transition may be governed by priority ranks and pre-determined area allowances. For example, it may be specified that when a length/width ratio of available area is not available for elements which are to occupy a certain percentage of space while still allowing for the display of elements side by side, the elements should be displayed in a vertical manner.

Figure 4E:
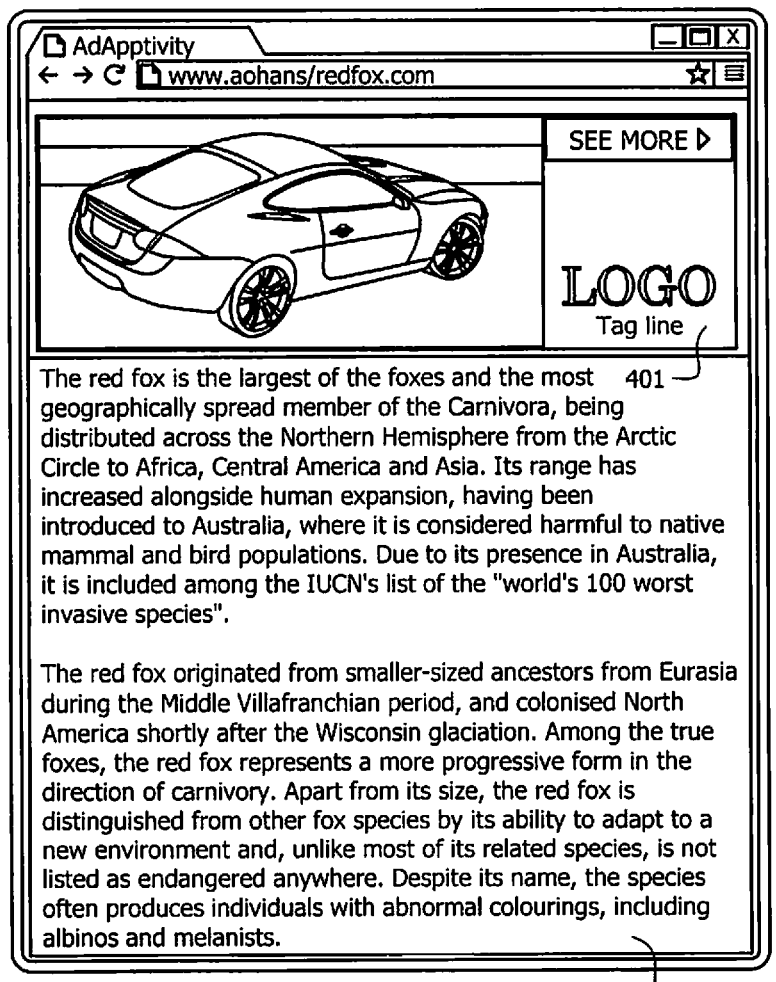
Figure 4F:
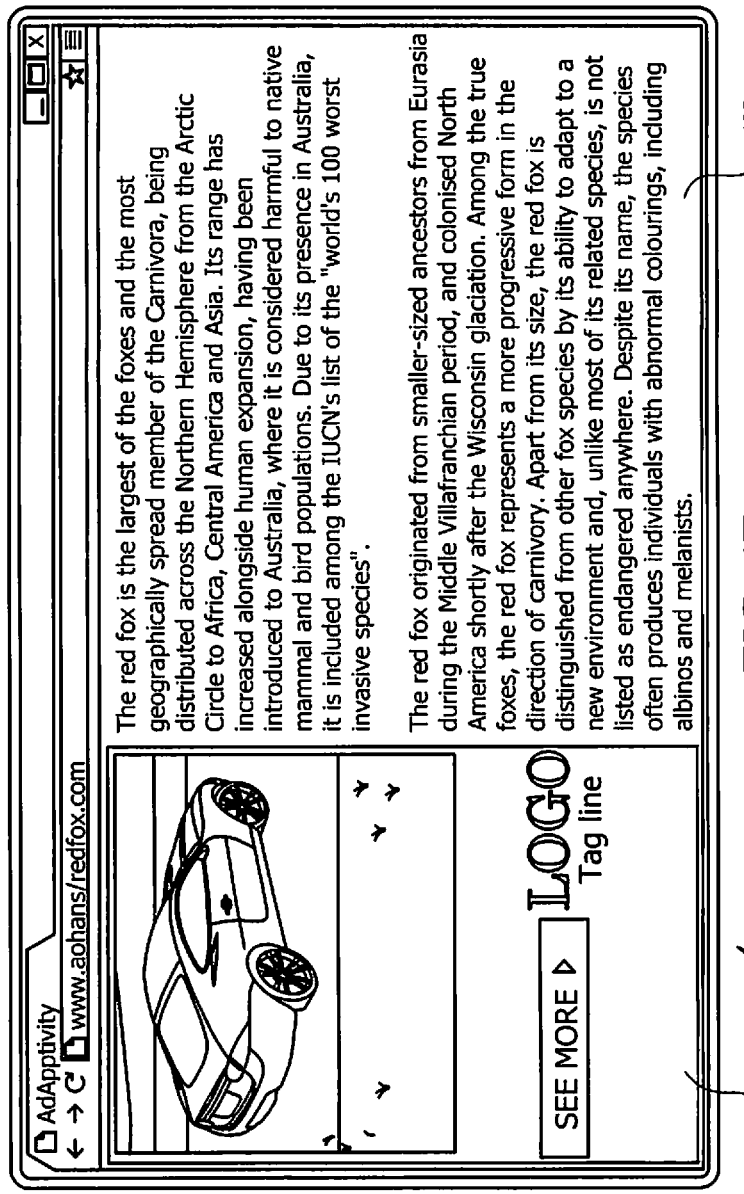
Figure 4G:
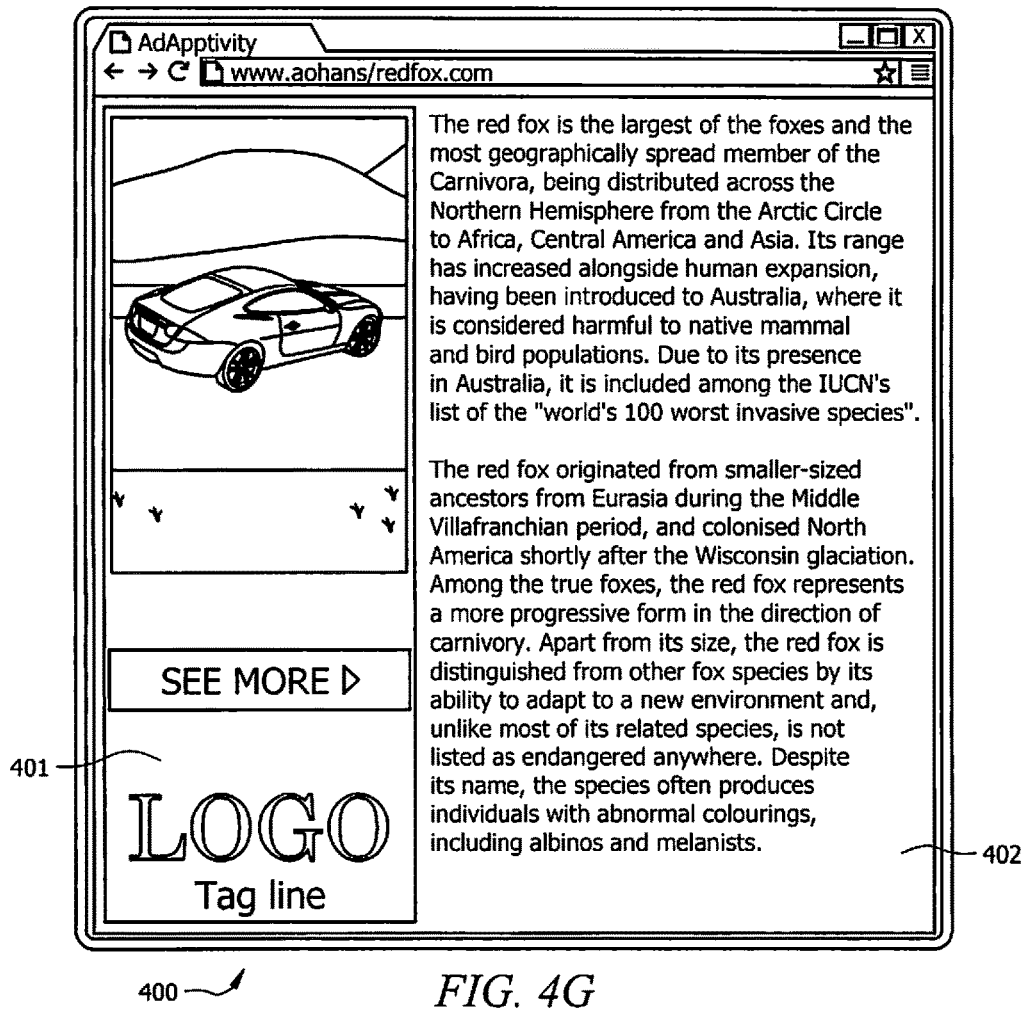
Figure 4H:
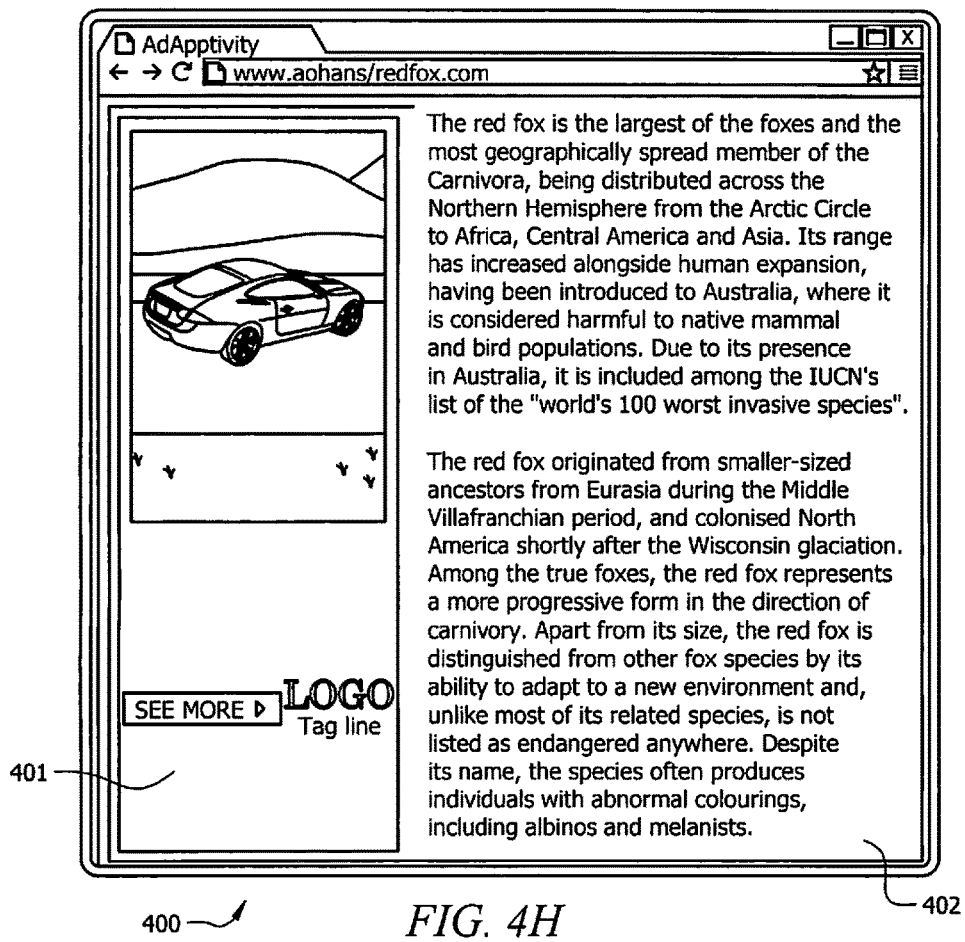

FIG. 4E illustrates an example display where the length/width ratio still calls for the call to action element and logo element to be stacked vertically, but advertisement portion 401 and content portion 402 have been scaled down to be smaller. FIGS. 4F-4H illustrate an example where the available area for displaying advertisement portion 401 is provided on the left side of the area with respect to content portion 402. Between FIGS. 4F and 4G additional vertical space has been given, thereby causing additional vertical content of the image element to be displayed and a transition of the layout of the call to action and logo elements. Additional width is provided in FIG. 4H which causes additional scaling and a transition in the layout of the call to action and logo elements.

It is noted that the transitions shown between the above examples may be made in a discrete manner such as would occur in an abrupt change in displayable area when a user maximizes or reduces a displayed window, changes from a portrait to a landscape view on a mobile or tablet device, etc. Additionally, the illustrated transitions may occur in an infinite or continuous manner, e.g. providing for constant scaling or repositioning upon the displayable area being altered such as when a user drags a displayed screen to increase its length, width, or both.

To accomplish this continuous scaling, embodiments may take the available space in the advertisement area and if there is more horizontal space than vertical space, then the first element may be filled in at the height of the available space and then fill in as much width is needed to maintain acceptable aspect ratios to position the first item. It then takes the remaining space and it does the same thing with remaining elements. If the available space is wider than it is high, then the embodiments may height constrain the elements and take the first element and scale it to fit the height and then make it as wide as necessary to maintain the aspect ratio of the item. And then it does that with the remaining elements until all the available space is filled. The order of elements to arrange may be determined by rank or by a specified size percentages of elements which are to be filled into the space. For example, in the example of FIGS. 4A-4H, the image element utilized 60%, the logo filled 25% and the call to action utilized 15% of the displayable area. The determination of whether to place the logo element and call to action element horizontally or vertically may be made based on the amount of space left over after filling the image element into the available area.

It is noted that in some embodiments, when the available displayable area for third party content reduces past a certain point, one or more elements of lower priority ranks may be dropped off from being displayed. Further, in some embodiments, lower priority elements may be shown only in instances where a large displayable area is available. For example, an advertisement may include a video presentation only in the event that sufficient area to view the video is provided. In this manner a plurality of elements may be optionally displayed based on the displayable area provided to the third party content provider.

Figure 5:
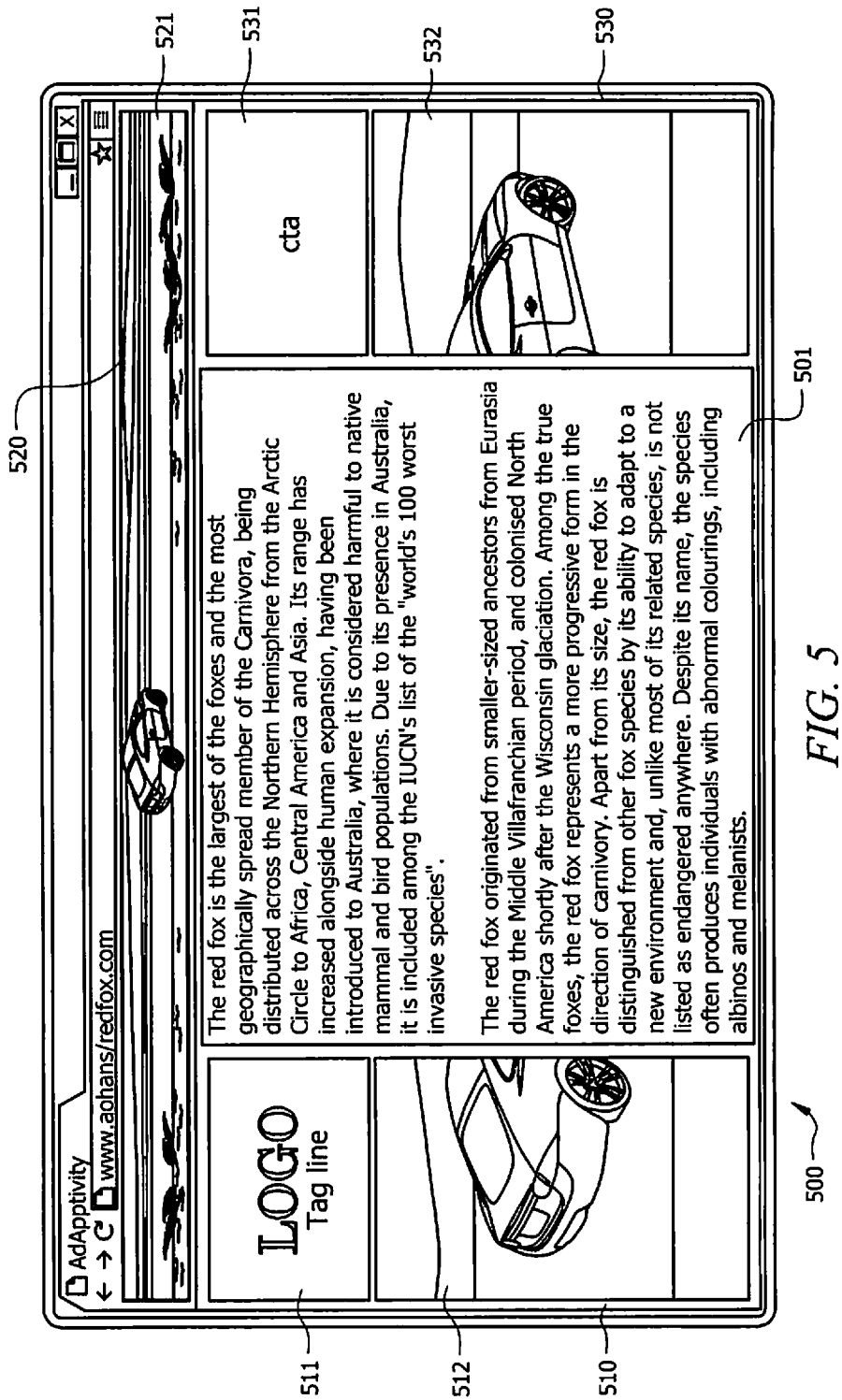
FIG. 5 illustrates a display having multiple advertisements in accordance with an embodiment of the present application.

FIG. 5 illustrates a display 500 having multiple advertisements in accordance with an embodiment of the present application. Display 500 includes a content portion 501, a first advertisement 510, second advertisement 520 and third advertisement 530. Within each advertisement, multiple elements may be provided. For example, first advertisement 510 includes a logo element 511 and image element 511, second advertisement 520 includes image element 521, and third advertisement 530 includes call to action element 531 and image element 532.

Each of these advertisements may be configured as described above. For example, each may have priority ranks, one or more safe zones within particular elements, and may have elements which are selectively displayed based on the available area for the advertisement. Further, in some embodiments the display of elements within advertisements 510, 520 and 530 may take into account content or elements which are displayed on each of the other advertisements. For example, when logo element 511 is present in first advertisement 510, third advertisement 530 may omit a logo element and utilize its displayable area for other elements. Further, in some embodiments, portions of elements may be split between multiple advertisements. For example, image element 512 and 532 may comprise the same image, but when displayed on the same page, elements 512 and 532 may work cooperatively (e.g. to divide the image between the respective image elements, etc.).

It is appreciated that the sharing of information and displaying of various elements between multiple advertisements may be implemented utilizing similar considerations as discussed above with respect to single advertisement embodiments. Considerations of when and what content to display may be configured in any manner suitable to deliver the desired content.

Figure 6:
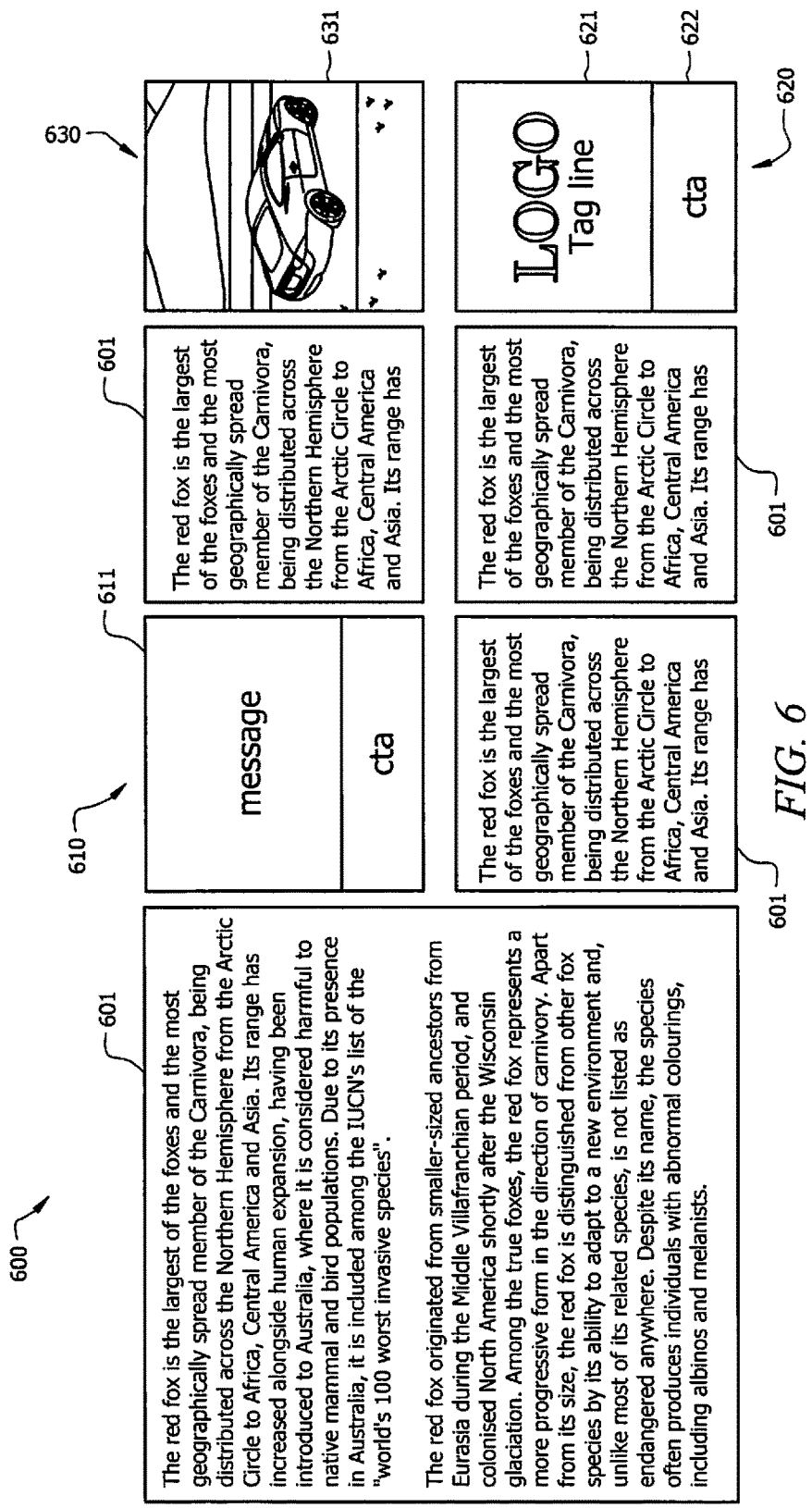
FIG. 6 illustrates a display having multiple advertisements in accordance with an embodiment of the present application.

FIG. 6 illustrates a display 600 having multiple advertisements in accordance with an embodiment of the present application. Display 600 may include one or more content portions 601. In this embodiment, display 600 is implemented in a tile-based content delivery system, such as is common on tablet and smartphone devices. Display 600 further includes a first advertisement 610 having a message element 611 and call to action element 612, a second advertisement 620 having an image element 621, and a third advertisement 630 having a logo element 631 and call to action element 632. The control of content within display 600 may be implemented as described above with respect to display 500 of FIG. 5.

Figure 7:
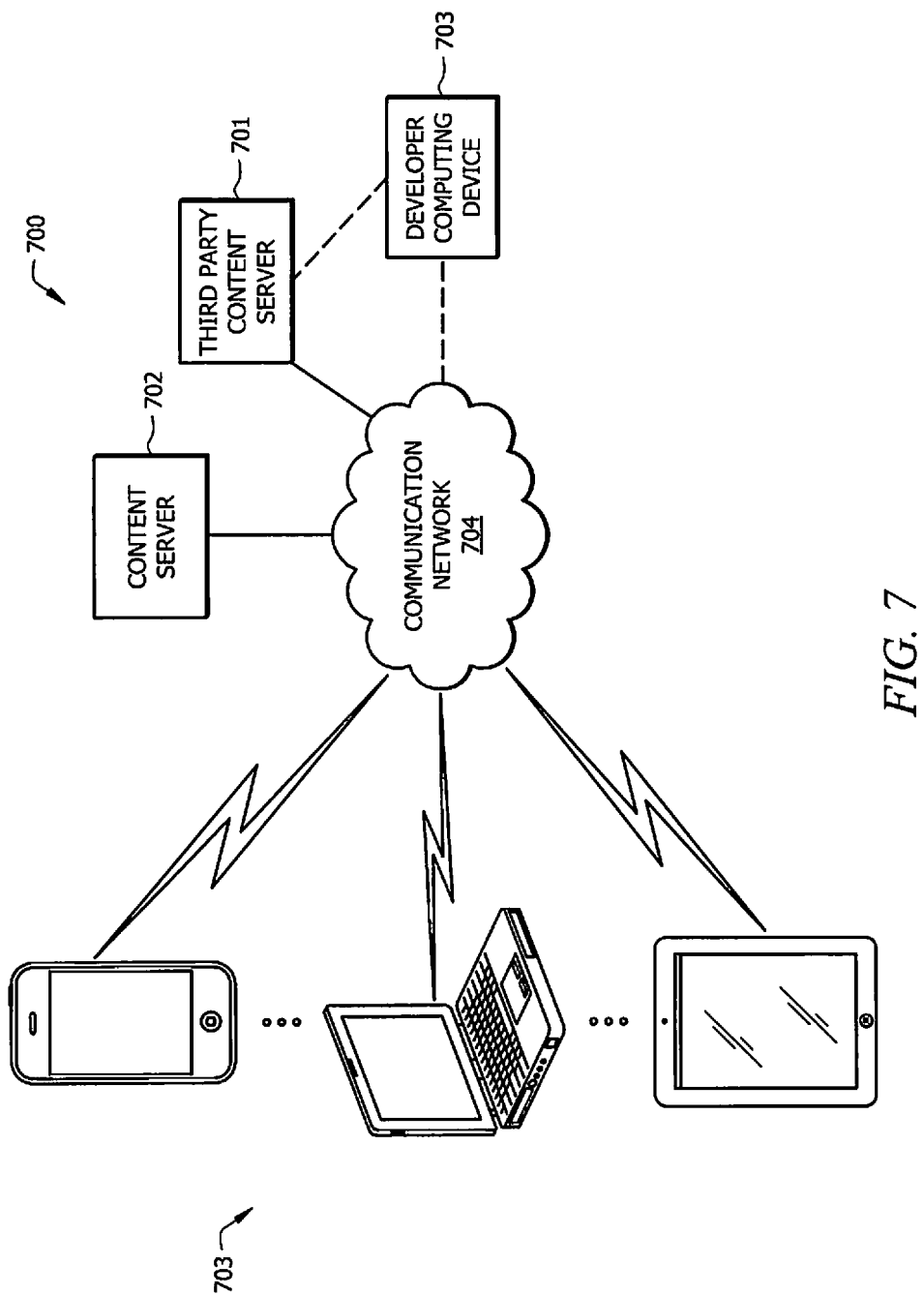
FIG. 7 illustrates a communication system for providing adaptable third party content in accordance with an embodiment of the present application.

FIG. 7 illustrates a communication system 700 for providing adaptable third party content in accordance with an embodiment of the present application. System 700 includes a third party content server 701, primary content server 702, and user devices 703 connected over communication network 704. System 700 may further include a developer computing device 705 which is connected to one or more of third party content server 701 and communication network 704.

Third party content server may include processing and storage capabilities sufficient to store and provide third party content to a content server and/or an end user device. Such third party content may include advertisements and the like, which are to be displayed with primary content. In some embodiments, third party content may be sent to the content server 702 which processes and combines the third party content with the primary content in order to transmit the data to one or more user devices 703 in a transmission session. In other embodiments, primary content may be delivered to one or more user devices 703 by primary content server 702 while third party content which is to be displayed with the primary content is delivered to the user devices 703 by third party content server 701. In other words, embodiments are not limited by the manner of delivery of the content to be displayed by a user device 703.

Developer computing device 705 may comprise processing and storage resources configured to facilitate the development of third party content data and may be utilized to, e.g. form an advertising campaign and the like. Additionally, display preferences, ranking of elements, designation of safe zones, etc., may be implemented within developer computing device 705. Developer computing device 705 may be in communication with third party content server 701 as part of a local network or over communication network 704. Additionally, in some embodiments functions implemented on developer computing device 705 may be implemented within third party content server 704.

User devices 703 may be any type of device which would facilitate the exchange of information within system 700. For example, user devices 703 may include computer systems, tablet devices, mobile telephones, and the like. Such devices will generally have processing and storage capabilities sufficient to receive information and/or execute one or more applications and display content associated with such information and/or applications. User devices 703 may have differing display capabilities and display sizes. Additionally, user devices 703 may have the ability to alter the displayable area of received and/or executed displayed content. Information may be sent from one or more of content server 702, and third party content server 701 in a manner where the third party content may be dynamically adjustable as described with respect to embodiments herein.

Communication network 704 may include any type of network which allows for communication between the devices of system 700. For example, communication network 130 may comprise the Internet, WiFi, mobile communications networks such as GSM, CDMA, 3G/4G, WiMax, LTE, and the like. Further, communications network 704 may comprise a combination of network types working collectively.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
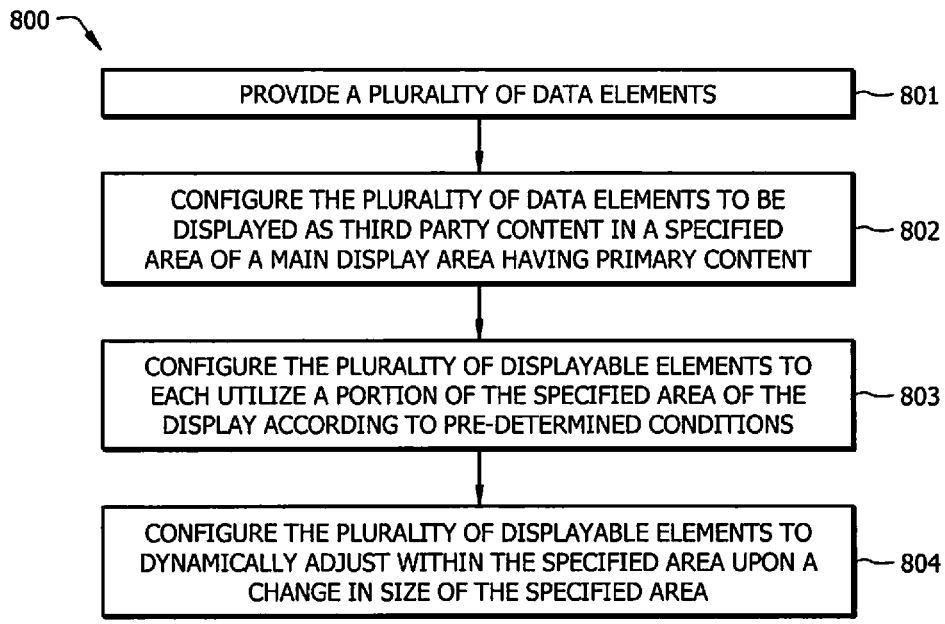
FIG. 8 illustrates an example method for allowing third party displayed content, which is displayed with primary content, to adapt in response to a change in permitted display space.

FIG. 8 illustrates an example method 800 for allowing third party displayed content, which is displayed with primary content, to adapt in response to a change in permitted display space. It is noted that method 800 may be implemented within one or more systems having sufficient processing capabilities, such as system 700 described above. Method 800 may include, at 801, providing a plurality of displayable elements. At step 802 the plurality of displayable elements are configured to be displayed as third party content in a specified area of a main display area having primary content. Method 800 may also include, at step 803 configuring the plurality of displayable elements to each utilize a portion of the specified area of the display area according to pre-determined conditions. Such conditions may be based on changes in size of the specified display area, ranking of displayable elements, the presence of safe zones within one or more displayable elements, etc.

Method 800 may further include, at step 804, configuring the plurality of displayable elements to dynamically adjust within the specified area upon a change in size of the specified area. Such a configuration may include configuring a first displayable element of the plurality of displayable elements is configured to adjust in a different manner than a second displayable element of the plurality of displayable elements.

Figure 9:
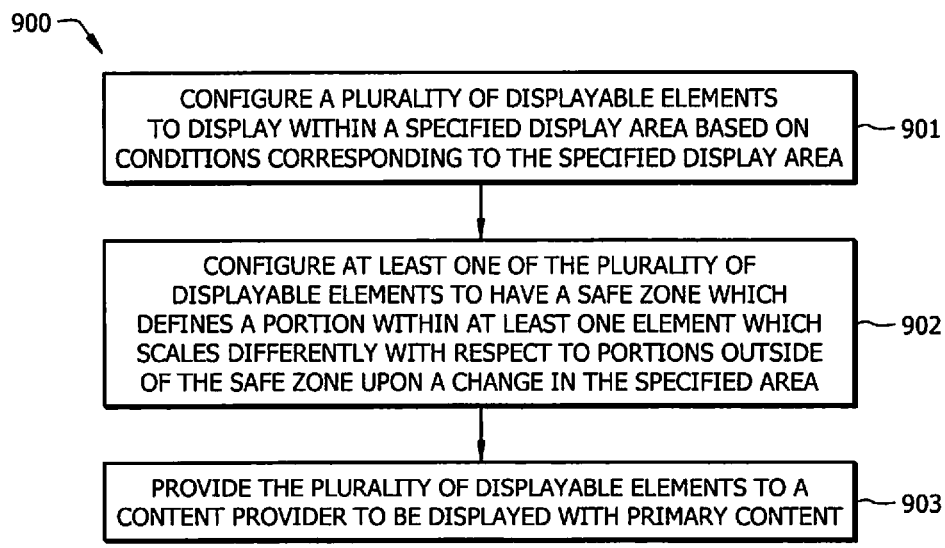
FIG. 9 illustrates an example method for allowing third party displayed content, which is displayed with primary content, to adapt in response to a change in permitted display space.

FIG. 9 illustrates an example method 900 for allowing third party displayed content, which is displayed with primary content, to adapt in response to a change in permitted display space. It is also noted that method 900 may be implemented within one or more systems having sufficient processing capabilities, such as system 700 described above. Method 900 may include, at step 901, configuring a plurality of displayable elements to display within a specified display area based on conditions corresponding to the specified display area. Additionally, method 900 may include, at step 902 configuring at least one of the plurality of displayable elements to have a safe zone which defines a portion within at least one element which scales differently with respect to portions outside of the safe zone upon a change in the specified area. Method 900 may further include, at step 903, providing the plurality of displayable elements to a content provider to be displayed with primary content.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   providing a plurality of displayable elements configured to be displayed as third party content in a specified area of a display area having a primary content portion and a third party content portion, wherein said specified area corresponds to said third party content portion;
   configuring, by a processing device, the plurality of displayable elements to each utilize a portion of the specified area of the display area according to pre-determined conditions; and
   configuring the plurality of displayable elements to dynamically adjust within the specified area upon a change in size of the specified area, wherein a first displayable element of said plurality of displayable elements displayed as third party content in the specified area is configured to adjust in a different manner than a second displayable element of said plurality of displayable elements displayed as third party content in the specified area.

2. The method of claim 1 wherein configuring the plurality of displayable elements to utilize a portion of the specified area according to pre-determined conditions further comprises providing a priority rank to the plurality of displayable elements.

3. The method of claim 2 wherein an element of the plurality of displayable elements having a lower priority rank is provided with less area within the specified area to be displayed with respect to a higher ranked element.

4. The method of claim 2 wherein an element of the plurality of displayable elements having a lower priority rank is configured to not display in the event that the specified area becomes smaller than a pre-determined threshold minimum size for the element.

5. The method of claim 2 wherein an element of the plurality of displayable elements having a lower priority rank is configured to display in the event that the specified area becomes larger than a pre-determined threshold minimum size for the element.

6. The method of claim 1 wherein at least one element of the plurality of displayable elements comprises a safe zone defining a portion within the element having different display rules with respect to portions outside of the safe zone, whereupon in response to a change in the specified area, the display rules are configured to cause the area within the safe zone to be displayed at times when portions of the area outside of the safe zone are being brought into view or taken out of view.

7. The method of claim 1 wherein the content layout scheme of the plurality of displayable elements is configured to alter upon a change in the specified area crossing a pre-determined threshold.

8. The method of claim 1 wherein the first displayable element of said plurality of elements is configured to scale at a different rate than the second displayable element of said plurality of displayable elements.

9. The method of claim 1 further comprising configuring the plurality of displayable elements to display over a plurality of specified areas of the display area having the primary content portion.

10. The method of claim 1 further comprising transmitting the configured plurality of displayable elements to one or more of a primary content provider and end user.

11. The method of claim 1 wherein at least one of the plurality of displayable elements, when displayed, includes an overlapping item which is configured to alter the placement of the overlapping item with respect to the displayed element in a pre-determined manner in response to a change in the specified area to avoid covering a safe zone.

12. An apparatus comprising:
   at least one processor configured to:

provide a plurality of displayable elements configured to be displayed as third party content in a specified area of a display area having a primary content portion and a third party content portion, wherein said specified area corresponds to said third party content portion;

configure the plurality of displayable elements to each utilize a portion of the specified area of the display area according to pre-determined conditions; and configure the plurality of displayable elements to dynamically adjust within the specified area upon a change in size of the specified area, wherein a first displayable element of said plurality of displayable elements displayed as third party content in the specified area is configured to adjust in a different manner than a second displayable element of said plurality of displayable elements displayed as third party content in the specified area.

13. The apparatus of claim 12 wherein the at least one processor is configured to provide a priority rank to the plurality of displayable elements.

14. The apparatus of claim 13 wherein an element of the plurality of displayable elements having a lower priority rank is provided with less area within the specified area to be displayed with respect to a higher ranked element.

15. The apparatus of claim 13 wherein an element of the plurality of displayable elements having a lower priority rank is configured to not display in the event that the specified area becomes smaller than a pre-determined threshold minimum size for the element.

16. The apparatus of claim 13 wherein at least one element of the plurality of displayable elements comprises a safe zone defining a portion within the element having different display rules with respect to portions outside of the safe zone, whereupon in response to a change in the specified area, the display rules are configured to cause the area within the safe zone to be displayed at times when portions of the area outside of the safe zone are being brought into view or taken out of view.

17. The apparatus of claim 12 wherein the content layout scheme of the plurality of displayable elements is configured to alter upon a change in the specified area crossing a pre-determined threshold.

18. The apparatus of claim 12 wherein the first displayable element of said plurality of elements is configured to scale at a different rate than the second displayable element of said plurality of displayable elements.

19. The apparatus of claim 12 further comprising configuring the plurality of displayable elements to display over a plurality of specified areas of the display area having the primary content portion.

20. The apparatus of claim 12 wherein at least one of the plurality of displayable elements, when displayed, includes an overlapping item which is configured to alter the placement of the overlapping item with respect to the displayed element in a pre-determined manner in response to a change in the specified area to avoid covering a safe zone.

21. A method comprising:
configuring, by a processing device, a plurality of displayable elements to display within a specified display area based on conditions corresponding to the specified display area;

configuring at least one of the plurality of displayable elements to have a safe zone which defines a portion within the at least one element having different display rules with respect to portions outside of the safe zone, whereupon in response to a change in the specified area, the display rules are configured to cause the area within the safe zone to be displayed at times when portions of the area outside of the safe zone are being brought into view or taken out of view; and providing the plurality of displayable elements to a content provider to be displayed with primary content, wherein at least one of the plurality of displayable elements, when displayed, includes an overlapping item which is configured to alter the placement of the overlapping item with respect to the displayed element in a pre-determined manner in response to a change in the specified area, and wherein the display rules are configured to avoid covering, by the overlapping item, the area within the safe zone.

22. The method of claim 21 wherein conditions corresponding to the specified display area correspond to the location of the specified display area with respect to the primary content.

23. The method of claim 21 wherein conditions corresponding to the specified display area relate to changes in size of the specified displayable area.

24. The method of claim 21 further comprising configuring the plurality of displayable elements with one or more rank values which govern the display of the plurality of displayable elements.

* * * * *